(12) United States Patent
Lee

(10) Patent No.: US 12,301,386 B2
(45) Date of Patent: May 13, 2025

(54) ELECTRONIC DEVICE FOR ESTIMATING CHANNEL BASED ON FADING CHANNEL AND OPERATING METHOD THEREOF

(71) Applicant: Samsung Electronics Co., Ltd., Suwon-si (KR)

(72) Inventor: Ikbeom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 18/083,980

(22) Filed: Dec. 19, 2022

(65) Prior Publication Data

US 2023/0179448 A1    Jun. 8, 2023

Related U.S. Application Data

(63) Continuation of application No. PCT/KR2022/019751, filed on Dec. 6, 2022.

(30) Foreign Application Priority Data

Dec. 7, 2021    (KR) .................. 10-2021-0174095

(51) Int. Cl.
    *H04L 25/02*    (2006.01)
(52) U.S. Cl.
    CPC ...... *H04L 25/0224* (2013.01); *H04L 25/0222* (2013.01)
(58) Field of Classification Search
    CPC .................... H04L 25/0224; H04L 25/0222
    See application file for complete search history.

(56) References Cited

U.S. PATENT DOCUMENTS

| 7,903,691 B2 | 3/2011 | Hwang et al. |
| 8,121,206 B2 | 2/2012 | Lee et al. |
| (Continued) | | |

FOREIGN PATENT DOCUMENTS

| EP | 1716680 B1 | 8/2008 |
| JP | 4413232 B2 | 2/2010 |
| (Continued) | | |

OTHER PUBLICATIONS

International Search Report and Written Opinion dated Mar. 16, 2023, issued in International Patent Application No. PCT/KR2022/019751.

(Continued)

*Primary Examiner* — Zhiren Qin
(74) *Attorney, Agent, or Firm* — Jefferson IP Law, LLP

(57) ABSTRACT

An electronic device and a method for estimating a channel based on a fading channel in an electronic device are provided. The electronic device includes at least one antenna, a communication circuit, and at least one processor operably coupled with the at least one antenna and the communication circuit, wherein the at least one processor is configured to obtain a channel characteristic of a reception signal received through the at least one antenna, set a weight and a channel estimation interval for channel estimation based on the channel characteristic of the reception signal, estimates a channel of the reception signal by applying the set weight to at least one subcarrier included in the set channel estimation interval among a plurality of subcarriers included in a reference signal included in the reception signal.

20 Claims, 15 Drawing Sheets

(56) References Cited

U.S. PATENT DOCUMENTS

| | | |
|---|---|---|
| 8,339,930 B2 | 12/2012 | Gore et al. |
| 8,908,797 B2 | 12/2014 | Jeckein |
| 9,055,602 B2 | 6/2015 | Kim et al. |
| 9,912,506 B2 | 3/2018 | Hong et al. |
| 10,785,085 B2 | 9/2020 | Jardel et al. |
| 2005/0135509 A1 | 6/2005 | Mantravadi et al. |
| 2006/0268676 A1 | 11/2006 | Gore et al. |
| 2009/0285315 A1 | 11/2009 | Wu |
| 2010/0085866 A1 | 4/2010 | Li et al. |
| 2011/0096853 A1 | 4/2011 | Jayaraman et al. |
| 2012/0033751 A1 | 2/2012 | Sathananthan et al. |
| 2013/0034140 A1* | 2/2013 | Kil .................. H04L 25/022 375/224 |
| 2013/0121393 A1* | 5/2013 | Fang ................ H04L 25/022 375/232 |
| 2013/0170539 A1 | 7/2013 | Huang et al. |
| 2014/0269882 A1 | 9/2014 | Thompson et al. |
| 2017/0257246 A1* | 9/2017 | Zhuang ............. H04L 7/0058 |
| 2018/0219709 A1* | 8/2018 | Pawar ............... H04L 27/2607 |
| 2018/0270087 A1* | 9/2018 | Yamazaki .......... H04L 25/025 |
| 2019/0097843 A1* | 3/2019 | Obara ............... H04B 7/0413 |
| 2020/0196318 A1* | 6/2020 | Lee .................. H04L 27/14 |
| 2022/0052728 A1 | 2/2022 | Walk et al. |
| 2022/0190894 A1 | 6/2022 | Kamiya et al. |

FOREIGN PATENT DOCUMENTS

| | | |
|---|---|---|
| KR | 10-2008-0009332 A | 1/2008 |
| KR | 10-2008-0048486 A | 6/2008 |
| KR | 10-100880894 B1 | 1/2009 |
| KR | 10-0896654 B1 | 5/2009 |
| KR | 10-1275806 B1 | 6/2013 |
| KR | 10-1480620 B1 | 1/2015 |
| KR | 10-2136288 B1 | 7/2020 |
| KR | 10-2021-0139244 A | 11/2021 |
| WO | 2020/217941 A1 | 10/2020 |

OTHER PUBLICATIONS

European Search Report dated Feb. 20, 2025, issued in European Application No. 22904637.0.

* cited by examiner

ELECTRONIC DEVICE FOR ESTIMATING CHANNEL BASED ON FADING CHANNEL AND OPERATING METHOD THEREOF

CROSS-REFERENCE TO RELATED APPLICATION(S)

This application is a continuation application, claiming priority under § 365(c), of an International application No. PCT/KR2022/019751, filed on Dec. 6, 2022, which is based on and claims the benefit of a Korean patent application number 10-2021-0174095, filed on Dec. 7, 2021, in the Korean Intellectual Property Office, the disclosure of which is incorporated by reference herein in its entirety.

TECHNICAL FIELD

The disclosure relates to a device and a method for adaptively estimating a channel based on a fading channel in an electronic device of a wireless communication system.

BACKGROUND ART

In a wireless communication system, a wireless channel used for transmission and/or reception of a signal may change irregularly on a wireless resource (e.g., a time resource and/or a frequency resource). A reception device of the wireless communication system may perform channel estimation to determine distortion of a reception signal caused by an irregular change in the wireless channel. The reception device may decode a transmission signal transmitted by a transmission device from the reception signal based on a channel estimation value.

The above information is presented as background information only to assist with an understanding of the disclosure. No determination has been made, and no assertion is made, as to whether any of the above might be applicable as prior art with regard to the disclosure.

DISCLOSURE

Technical Problem

A signal received by a reception device of a wireless communication system may be distorted by multipath fading caused by an influence of a surrounding environment. Multipath fading may occur when a transmission signal transmitted by a transmission device is scattered to various paths due to the influence of the surrounding environment (e.g., reflection and/or scattering of radio waves) and received by the reception device.

A signal received through a multipath fading channel may be affected by a fading channel in a frequency domain. Accordingly, the reception device of the wireless communication system requires a method for estimating a channel adaptively to a change in a channel in the frequency domain.

Aspects of the disclosure are to address at least the above-mentioned problems and/or disadvantages and to provide at least the advantages described below. Accordingly, an aspect of the disclosure is to provide a device and a method for estimating a channel based on a fading channel in an electronic device of a wireless communication system.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one antenna, a communication circuit, and a processor operably coupled with the at least one antenna and the communication circuit, wherein the processor may be configured to obtain a channel characteristic of a reception signal received through the at least one antenna, set a weight and a channel estimation interval for channel estimation based on the channel characteristic of the reception signal, estimates a channel of the reception signal by applying the set weight to at least one subcarrier included in the set channel estimation interval among a plurality of subcarriers included in a reference signal included in the reception signal.

In accordance with another aspect of the disclosure, a method for operating an electronic device is provided. The method includes obtaining a channel characteristic of a reception signal received through the at least one antenna, setting a weight and a channel estimation interval for channel estimation based on the channel characteristic of the reception signal, estimating a channel of the reception signal by applying the set weight to at least one subcarrier included in the set channel estimation interval among a plurality of subcarriers included in a reference signal included in the reception signal.

Advantageous Effects

According to various embodiments of the disclosure, by estimating a channel based on channel estimation variables (e.g., channel estimation range and/or weight) set based on a channel characteristic (e.g., channel response length (CRL) and/or signal to noise ratio (SNR)) of a reception signal in an electronic device (e.g., reception device) of a wireless communication system, reception performance of the reception device can be improved.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
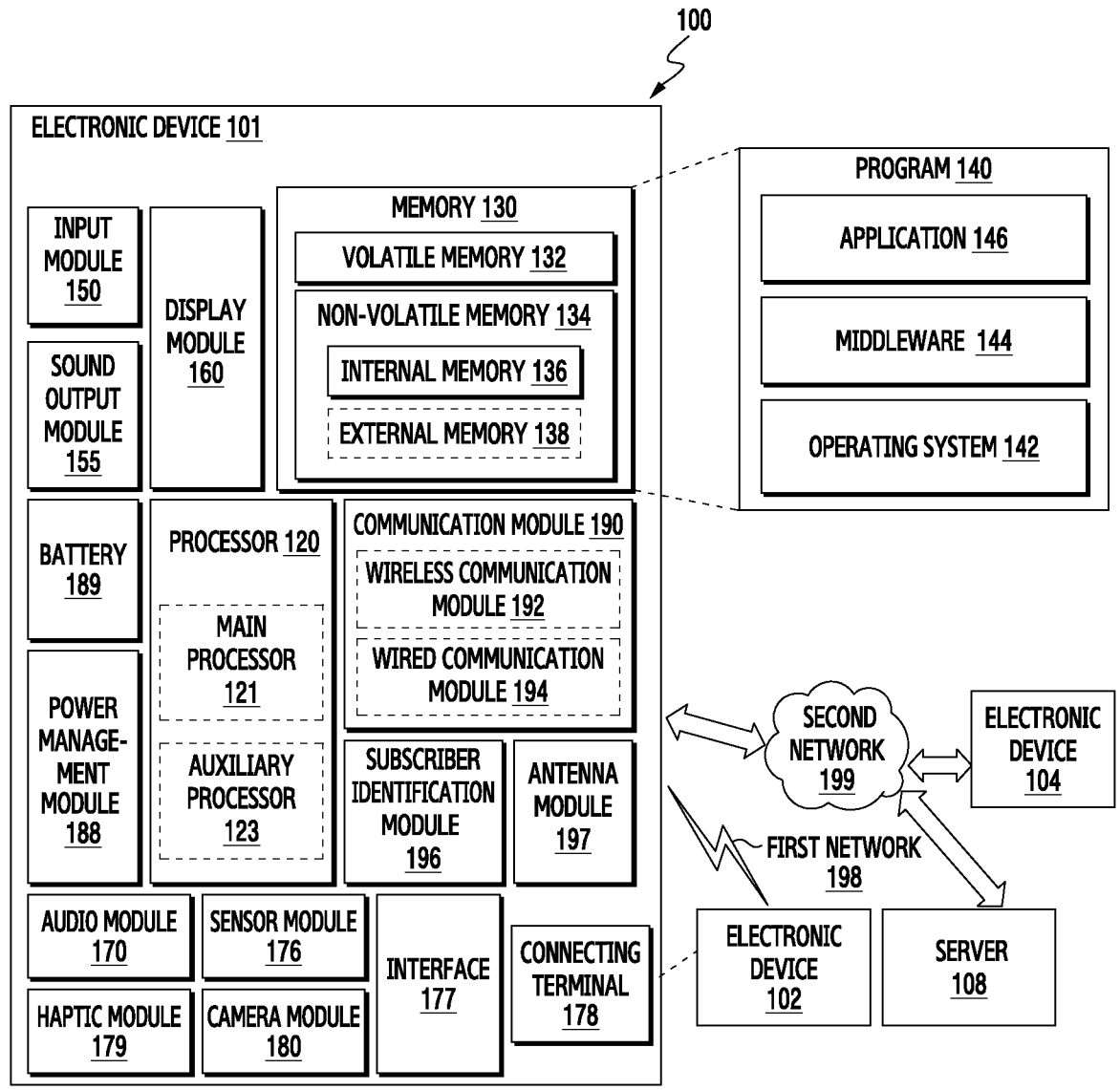
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following description, an electronic device may comprise a reception device that receives a signal (or data) from a transmission device of a wireless communication system. For example, the electronic device may comprise a base station that receives a signal (or data) from a terminal. For example, the base station may be at least one of a Node B, a base station (BS), an eNode B (eNB), or a gNode B (gNB). For example, the electronic device may comprise a terminal that receives a signal (or data) from the base station. For example, the terminal may be at least one of a user equipment (UE), a mobile station (MS), a cellular phone, a smartphone, a computer, or a multimedia system capable of performing a communication function.

Figure 2:
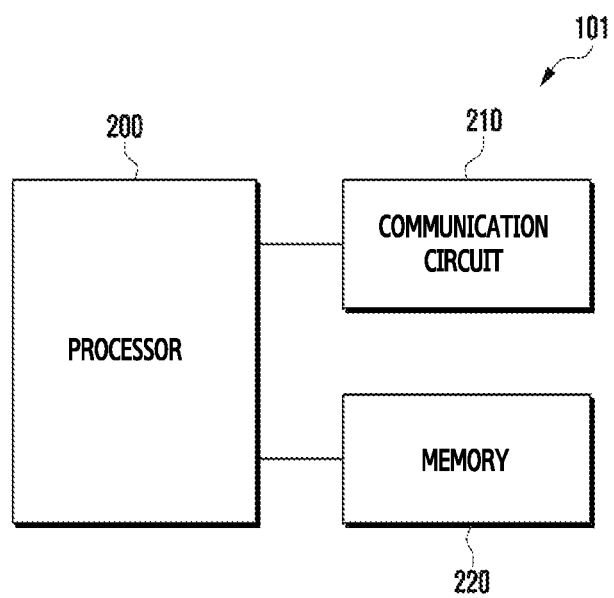
FIG. 2 is a block diagram of an electronic device for channel estimation according to an embodiment of the disclosure.

FIG. 2 is a block diagram of an electronic device for channel estimation according to an embodiment of the disclosure.

Figure 3:
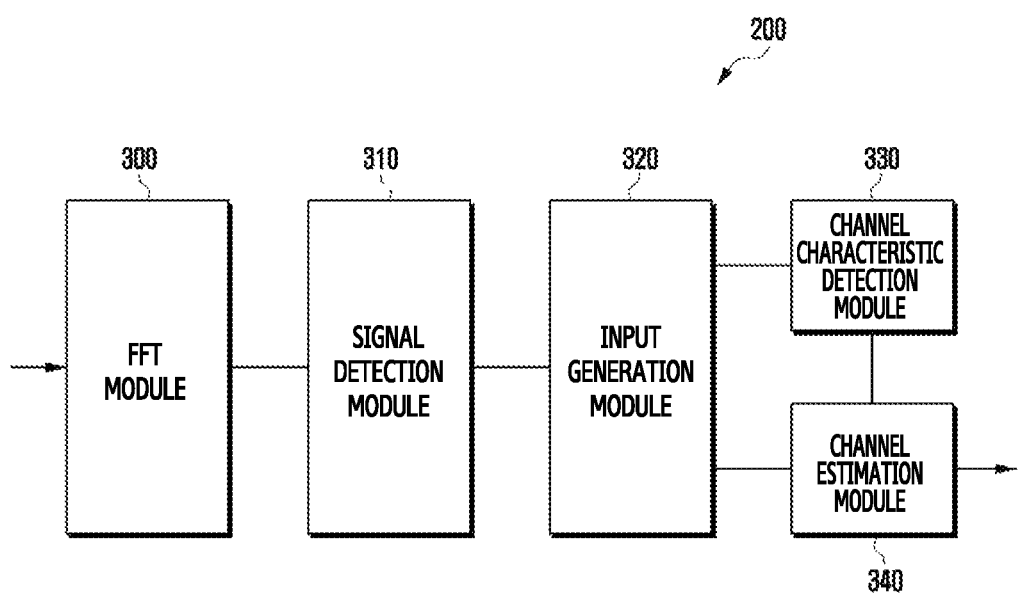
FIG. 3 is a block diagram for adaptively estimating a channel based on a fading channel in an electronic device according to an embodiment of the disclosure.

FIG. 3 is a block diagram for adaptively estimating a channel based on a fading channel in an electronic device according to an embodiment of the disclosure.

Referring to FIGS. 2 and 3, the electronic device 101 may comprise a processor 200, a communication circuit 210, and/or a memory 220. According to an embodiment, the processor 200 may be substantially the same as the processor 120 (e.g., a communication processor (CP)) of FIG. 1 or may comprise the processor 120. The communication circuit 210 may be substantially the same as the wireless communication module 192 of FIG. 1, or may comprise a wireless communication module 192. The memory 220 may be substantially the same as the memory 130 of FIG. 1 or may comprise the memory 130. According to an embodiment, the processor 200 may be operatively connected to the communication circuit 210 and/or the memory 220.

According to various embodiments, the processor 200 may check channel characteristics of a signal received through the communication circuit 210. For example, the channel characteristic may comprise a channel response length (CRL) and/or a signal to noise ratio (SNR) of a reception signal. According to an embodiment, as shown in FIG. 3, the processor 200 may comprise a fast Fourier transform (FFT) module 300, a signal detection module 310, an input generation module 320, a channel characteristic detection module 330, and/or a channel estimation module 340. For example, the FFT module 300, the signal detection module 310, the input generation module 320, the channel characteristic detection module 330, and/or the channel estimation module 340 may be configured with different circuits or different hardware. For example, the FFT module 300, the signal detection module 310, the input generation module 320, the channel characteristic detection module 330, and/or the channel estimation module 340 may be logically (e.g., software) divided within the same circuit or hardware.

According to an embodiment, the FFT module 300 of the processor 200 may convert a signal in a time domain provided from the communication circuit 210 into a signal in a frequency domain through a fast Fourier transform (FFT) operation. According to an embodiment, the signal detection module 310 of the processor 200 may detect a signal corresponding to at least one resource block (RB) allocated to the electronic device 101 for wireless communication from the signal of the frequency domain converted by the FFT module 300.

According to an embodiment, the input generation module 320 of the processor 200 may generate an input signal for channel estimation based on a signal and a reference signal corresponding to at least one resource block (RB) allocated to the electronic device 101. For example, the input generation module 320 may generate an input signal for channel estimation through decorrelation with respect to a signal corresponding to at least one resource block (RB) allocated to the electronic device 101. For example, the input signal for channel estimation may be generated by applying a complex conjugate of a reference signal to a signal corresponding to at least one resource block (RB) allocated to the electronic device 101. For example, the input generation module 320 may generate an input signal for channel estimation by dividing a signal corresponding to at least one resource block (RB) allocated to the electronic device 101 into a reference signal. For example, the reference signal may comprise a demodulation reference signal (DMRS). For example, a signal corresponding to at least one resource block (RB) allocated to the electronic device 101 may comprise a reference signal sequence (e.g., DMRS sequence) corresponding to a symbol (e.g., DMRS symbol) comprising a reference signal among reception signals provided from the communication circuit 210.

According to an embodiment, the channel characteristic detection module 330 of the processor 200 may check (or detect) channel characteristics of the reception signal based on an input signal for channel estimation generated by the input generation module 320. For example, the channel characteristic detection module 330 may check the channel characteristics with respect to a symbol (e.g., DMRS symbol) comprising a reference signal among the reception signals provided from the communication circuit 210.

For example, the channel characteristic detection module 330 may convert an output signal of the input generation module 320 into a signal (e.g., sample) in a time domain. For example, the output signal of the input generation module 320 may be converted into a signal (e.g., sample) in the time domain through an inverse discrete Fourier transform (IDFT) operation. The channel characteristic detection module 330 may calculate the power of the complex sample output by the IDFT operation for each sample. For example, the power of the sample may be calculated by applying the complex conjugate to the complex sample output by the IDFT operation.

For example, the channel characteristic detection module 330 may set a first interval (e.g., delay interval) and a second interval (e.g., advance interval) in the signal of the time domain. The channel characteristic detection module 330 may rearrange samples included in the first interval and the second interval. For example, the first interval and/or the second interval may be set to a fixed length or may be set based on power of each sample.

For example, the channel characteristic detection module 330 may detect at least one peak power based on power of samples included in the rearranged first interval and second interval. For example, the at least one peak power may comprise a global peak and/or at least one local peak. For example, the at least one peak power may comprise a global peak and/or at least one local peak exceeding the designated first reference power. For example, the global peak may comprise a sample (or an index of the sample) having the maximum power among samples included in the rearranged first interval and the second interval. For example, the local peak may comprise at least one peak smaller than the global peak in the rearranged first interval and the second interval.

For example, the channel characteristic detection module 330 may detect a channel response length (CRL) of the reception signal based on an index of at least one sample corresponding to at least one peak power included in the rearranged first interval and the second interval. For example, the channel characteristic detection module 330 may determine a difference between the minimum index and the maximum index among the indexes of the at least one sample corresponding to the at least one peak power as a channel response length (CRL) of the reception signal. For example, the channel response length (CRL) may be revised based on a ratio of a size of a resource (e.g., a size of an IDFT) allocated to the electronic device 101 to a size of a resource (e.g., an FFT size) that the electronic device 101 may use for wireless communication.

For example, the channel characteristic detection module 330 may set a third interval (e.g., noise interval) based on at least a portion of a remaining section not set as the first interval and the second interval in the signal of the time domain converted through the IDFT operation. The channel characteristic detection module 330 may detect noise power of a reception signal based on power of at least one sample included in the third interval. For example, the noise power may be revised based on a ratio of the size of the third interval to the size of the resource allocated to the electronic device 101 (e.g., the size of the IDFT).

For example, the channel characteristic detection module 330 may detect signal power of the reception signal based on power of at least one sample exceeding the designated second reference power among samples included in the first interval and the second interval. The channel characteristic detection module 330 may detect a signal to noise ratio (SNR) of the reception signal based on noise power and signal power of the received signal.

According to various embodiments, the processor 200 may estimate a channel of the reception signal based on channel characteristics of the signal received through the communication circuit 210. According to an embodiment, the channel estimation module 340 of the processor 200 may detect a channel estimation range and/or a weight based on channel characteristics of the reception signal detected by the channel characteristic detection module 330. For example, the processor 200 may select a channel estimation range and/or a weight corresponding to the channel characteristics of the reception signal within the designated table. For example, the processor 200 may calculate a channel estimation range and/or weight by applying channel characteristics of a reception signal to a designated function. For example, the channel estimation range may be set to be relatively smaller as the CRL is relatively larger. For example, the weight may be set by applying a relatively high weight as the CRL is relatively larger and is more adjacent to the subcarrier for channel estimation. For example, the weight applied to signals included in the channel estimation range may be similarly set as the CRL is relatively smaller. For example, the channel estimation range may be set to be relatively smaller as the SNR is relatively smaller. For example, the weight may be set to a relatively high weight as the SNR is relatively smaller. For example, the weight may be set to a relatively high weight as the carrier frequency is more adjacent to the subcarrier for channel estimation. For example, the weight applied to signals included in the channel estimation range may be similarly set as the SNR is relatively larger.

According to an embodiment, the channel estimation module 340 may estimate a channel of the received signal by applying a weight corresponding to the channel characteristic to at least a portion included in the channel estimation range corresponding to the channel characteristic of the received signal among the input signals for channel estimation generated by the input generation module 320.

According to various embodiments, the communication circuit 210 may support wireless communication of the electronic device 101 through at least one antenna (e.g., antenna module 197 of FIG. 1). According to an embodiment, the communication circuit 210 may include a radio frequency integrated circuit (RFIC) and a radio frequency front end (RFFE) for receiving a signal (or data) from the transmission device through at least one antenna (e.g., antenna module 197 of FIG. 1). For example, wireless communication may comprise communication based on at least one of a second generation (2G) network (e.g., global system for mobile communication (GSM)), a third generation (3G) network (e.g., universal mobile telecommunications system (UMTS)), a 4G network (e.g., long term evolution (LTE)), or a 5G network (e.g., new radio (NR)). According to an embodiment, the processor 200 and the communication circuit 210 may be configured with different circuits or different hardware. According to an embodiment, the processor 200 and the communication circuit 210 may be logically (e.g., software) divided within one circuit or one hardware.

According to various embodiments, the memory 220 may store various data used by at least one component (e.g., the processor 200 and/or the communication circuit 210) of the electronic device 101. According to an embodiment, the memory 220 may store various instructions that may be executed through the processor 200.

According to various embodiments, the electronic device 101 (e.g., the processor 200) may determine a calculation period of a minimum mean square error (MMSE) weight in a frequency domain based on a channel characteristic (e.g., CRL) of a reception signal. According to an embodiment, when it is determined that the channel corresponds to a flat fading channel based on the channel characteristics of the reception signal, the processor 200 may set the calculation period of the MMSE weight to the first unit (e.g., RB unit). For example, the flat fading channel may comprise a channel in which the channel change is relatively small in the frequency domain. According to an embodiment, when it is determined that the channel corresponds to a selective fading channel based on the channel characteristics of the reception signal, the processor 200 may set the calculation period of the MMSE weight to a second unit (e.g., a tone unit or a subcarrier unit) smaller than the first unit (e.g., RB unit). For example, the selective fading channel may comprise a channel having a relatively large channel change in the frequency domain. According to an embodiment, the processor 200 may reduce complexity for the MMSE operation by determining a calculation period of the MMSE weight in the frequency domain based on channel characteristics (e.g., CRL) of the reception signal.

According to various embodiments, the electronic device 101 (e.g., the processor 200) may operate multiple antennas based on channel characteristics (e.g., CRL) of the reception signal. According to an embodiment, when it is determined that the channel corresponds to a flat fading channel based on the channel characteristics of the reception signal, the processor 200 may operate on a relatively large number of streams for multiplexing. According to an embodiment, when it is determined that the channel corresponds to a selective fading channel based on the channel characteristics of the reception signal, the processor 200 may operate on a relatively small number of streams for multiplexing.

According to various embodiments, an electronic device (e.g., electronic device 101 of FIG. 1 or 2) may comprise at least one antenna (e.g., antenna module 197 of FIG. 1), a communication circuit (e.g., the wireless communication module 192 of FIG. 1 or the communication circuit 210 of FIG. 2), and a processor (e.g., processor 120 of FIG. 1 or processor 200 of FIG. 2) operably coupled with the at least one antenna and the communication circuit, wherein the processor may be configured to obtain a channel characteristic of a reception signal received through the at least one antenna, set a weight and a channel estimation interval for channel estimation based on the channel characteristic of the reception signal, estimates a channel of the reception signal by applying the set weight to at least one subcarrier included in the set channel estimation interval among a plurality of subcarriers included in a reference signal included in the reception signal.

According to various embodiments, the channel characteristic may include a channel response length and/or a signal to noise ratio.

According to various embodiments, the processor may be configured to convert the reception signal received through the at least one antenna into a signal in a frequency domain through a fast Fourier transform (FFT) operation, detect a signal corresponding to at least one resource region allocated to the electronic device for wireless communication with a transmission device from the signal of the frequency domain, generate an input signal for channel estimation based on the signal corresponding to the at least one resource region, and obtain the channel characteristic of the reception signal based on the input signal for channel estimation.

According to various embodiments, the processor may generate the input signal for channel estimation by applying a complex conjugate of the reference signal to the signal corresponding to the at least one resource region.

According to various embodiments, the processor may be configured to convert the input signal for channel estimation into samples of a time domain through an inverse discrete Fourier transform (IDFT) operation, obtain power of each of the samples in the time domain, set a first interval and a second interval to at least a portion of the samples in the time domain, rearrange indexes of the samples included in the first interval and the second interval; detect at least one sample having a peak power among the rearranged samples, and set a value of the channel response length of the reception signal based on an index of the at least one sample having the peak power.

According to various embodiments, the at least one sample may include at least one sample having a peak power that exceeds a designated reference power.

According to various embodiments, the designated reference power may be set based on a power of a global peak or a noise power among samples included in the first interval and the second interval.

According to various embodiments, the processor may set a difference between a smallest index and a largest index among the at least one sample having the peak power as the value of the channel response length of the reception signal.

According to various embodiments, the processor may revise the value of the channel response length based on a size of the FFT operation and a size of the IDFT operation.

According to various embodiments, the processor may estimate the channel of the reception signal by applying a weight set based on the channel characteristic of the reception signal to at least one subcarrier, among the plurality of subcarriers included in the input signal for channel estimation, included in a channel estimation interval set based on the channel characteristic of the reception signal.

Figure 4:
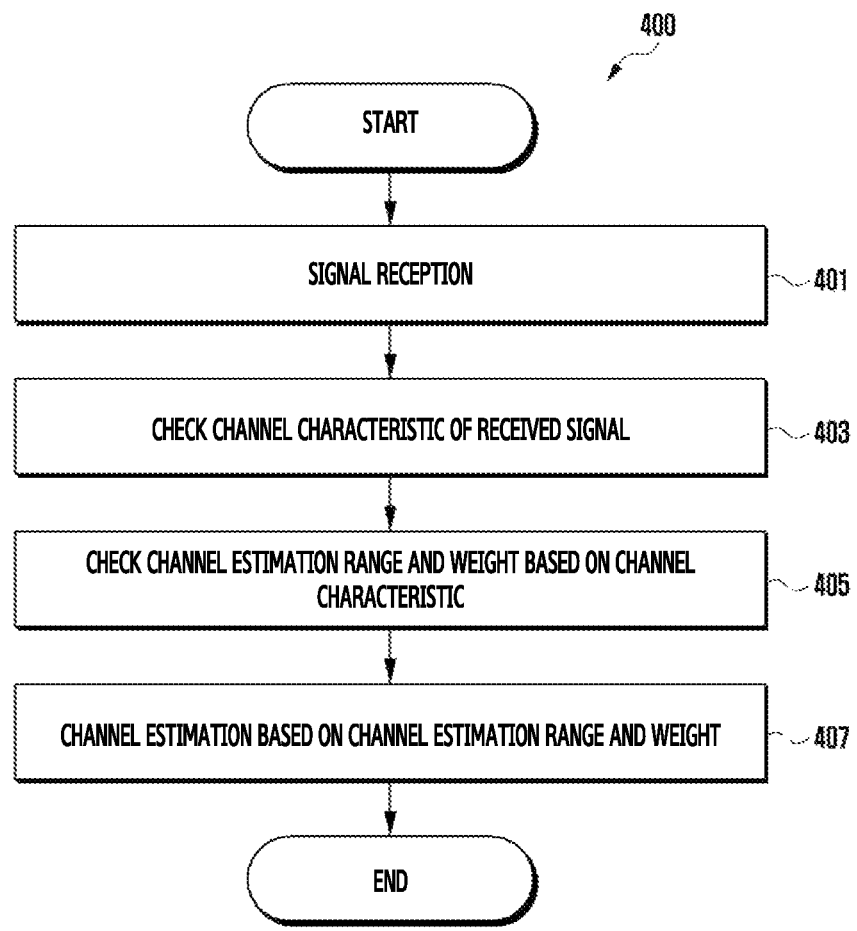
FIG. 4 is a flowchart for estimating a channel in an electronic device according to an embodiment of the disclosure.

FIG. 4 is a flowchart for estimating a channel in an electronic device according to an embodiment of the disclosure. In the following embodiment, each operation may be performed sequentially, but is not necessarily performed sequentially. For example, the order of each operation may be changed, and at least two operations may be performed in parallel. For example, the electronic device of FIG. 4 may be the electronic device 101 of FIG. 1 or 2.

Referring to FIG. 4, in a method 400, the electronic device (e.g., processor 120 of FIG. 1 or processor 200 of FIG. 2) may receive a signal from the transmission device through at least one antenna in operation 401.

According to various embodiments, in operation 403, the electronic device (e.g., processor 120 or 200) may check a channel characteristic of the reception signal. According to an embodiment, the processor 200 may convert a signal received through the communication circuit 210 into a signal in a frequency domain through an FFT operation. The processor 200 may generate an input signal for channel estimation based on a signal corresponding to at least one resource block (RB) allocated to the electronic device 101 and a reference signal among signals of the frequency domain. For example, a signal corresponding to at least one resource block (RB) allocated to the electronic device 101 may correspond to a symbol (e.g., DMRS symbol) including a reference signal among reception signals provided from the communication circuit 210. According to an embodiment, the processor 200 may detect a channel characteristic (e.g., CRL and/or SNR) of the reception signal based on the input signal (e.g., decorrelated DMRS sequence) for channel estimation.

According to various embodiments, in operation 405, the electronic device (e.g., the processor 120 or 200) may check the channel estimation range and/or weight based on the channel characteristic of the reception signal. According to an embodiment, the processor 200 may select a channel estimation range and/or a weight corresponding to the channel characteristic of the reception signal within the designated table. For example, when CRL of the reception signal is less than the designated first reference value, the processor 200 may select a first weight (or a first weight set) and/or a first channel estimation range within the designated table. For example, when the CRL of the reception signal is greater than or equal to the designated first reference value and is less than the designated second reference value, the processor 200 may select a second weight (or a second weight set) and/or a second channel estimation range within the designated table. For example, the designated second reference value may comprise a value greater than the designated first reference value. For example, when the CRL of the reception signal is greater than or equal to the designated second reference value, the processor 200 may select a third weight (or a third weight set) and/or a third channel estimation range within the designated table. For example, the first channel estimation range may be set to be larger than the second channel estimation range and the third channel estimation range. For example, the second channel estimation range may be set to be larger than the third channel estimation range. For example, the first weight may be set similarly to a weight applied to signals included in the channel estimation range (e.g., first channel estimation range). For example, the third weight may be set to apply a relatively high weight as it is closer to a subcarrier for channel estimation within a channel estimation range (e.g., third channel estimation range).

For example, when SNR of the reception signal is greater than or equal to the designated fourth reference value, the processor 200 may select a fourth weight (or a fourth weight set) and/or a fourth channel estimation range within the designated table. For example, when the SNR of the reception signal is smaller than the designated fourth reference value and is greater than or equal to the designated third reference value, the processor 200 may select a fifth weight (or a fifth weight set) and/or a fifth channel estimation range within the designated table. For example, the designated fourth reference value may include a value greater than the designated third reference value. For example, when the SNR of the reception signal is less than the designated third reference value, the processor 200 may select a sixth weight (or a sixth weight set) and/or a sixth channel estimation range within the designated table. For example, the fourth channel estimation range may be set to be larger than the fifth channel estimation range and the sixth channel estimation range. For example, the fifth channel estimation range may be set to be larger than the sixth channel estimation range. For example, the fourth weight may be similarly set to weights applied to signals included in a channel estimation range (e.g., a fourth channel estimation range). For example, the sixth weight may be set to apply a relatively high weight as it is closer to a subcarrier for channel estimation within a channel estimation range (e.g., a sixth channel estimation range).

According to an embodiment, the processor 200 may calculate a channel estimation range and/or weight by applying a channel characteristic of a reception signal to a designated function. For example, a designated function related to the weight may be defined as in Equation 1 below.

$$W_{CRL} = \text{func}_{weight}(CRL) \qquad \text{Equation 1}$$

For example, the WCRL may represent a weight (or a weight set) set based on the CRL, and the funcweight(CRL) may represent a designated function for setting the weight based on the CRL.

For example, a designated function related to the channel estimation range may be defined as in Equation 2 below.

$$L_{CRL} = \text{func}_{window}(CRL) \qquad \text{Equation 2}$$

For example, the LCRL may include information related to a channel estimation range set based on the CRL, and the funcwindow(CRL) may represent a designated function for setting a channel estimation range based on the CRL. For example, the funcwindow(CRL) may set a channel estimation range to minimize a channel estimation error (e.g., mean square error (MSE)).

According to various embodiments, in operation 407, the electronic device (e.g., the processor 120 or 200) may estimate a channel of the reception signal based on a channel estimation range and a weight set based on a channel characteristic of the reception signal. According to an embodiment, the processor 200 may estimate the channel of the reception signal by applying a weight corresponding to the channel characteristic to at least a portion included in the channel estimation range corresponding to the channel characteristic of the reception signal among the input signals for channel estimation. For example, a signal in the frequency domain converted through the FFT operation may be defined as in Equation 3 below.

$$Y_i = H_i x_i + n_i \qquad \text{Equation 3}$$

For example, Yi may represent a reception signal received through the i-th subcarrier, Hi may represent a channel of the i-th subcarrier, xi may represent a transmission signal transmitted from the transmission device through the i-th subcarrier, and ni may represent noise included in the i-th subcarrier.

For example, as Equation 4 below, the processor 200 may estimate the channel (e.g., $Y_k \cdot x_k^*$) of the reception signal corresponding to the i-th subcarrier by applying a weight (e.g., $W_{CRL}(i, k)$) corresponding to the channel characteristic of the reception signal to decorrelated reception signals (e.g., $\hat{H}_i$) of the k-th subcarriers included in the channel estimation range (e.g., i−LCRL to i+LCRL).

$$\hat{H}_i = \sum_{k=i-L_{CRL}}^{k=i+L_{CRL}} W_{CRL}(i, k) \cdot Y_k \cdot x_k^* \qquad \text{Equation 4}$$

For example, the LCRL may include information related to a channel estimation range set based on the CRL, WCRL (i, k) may represent a weight to be applied to a signal of the k-th carrier to estimate a channel of the i-th carrier based on the CRL, Yk may represent a reception signal received through the k-th subcarrier, and xk may represent a transmission signal transmitted from the transmission device through the k-th subcarrier. For example, Yk may represent an input signal for channel estimation generated based on decorrelation of the received signal of the k-th subcarrier. For example, xk may represent a complex conjugate of a transmission signal transmitted from the transmission device through the k-th subcarrier.

Figure 5:
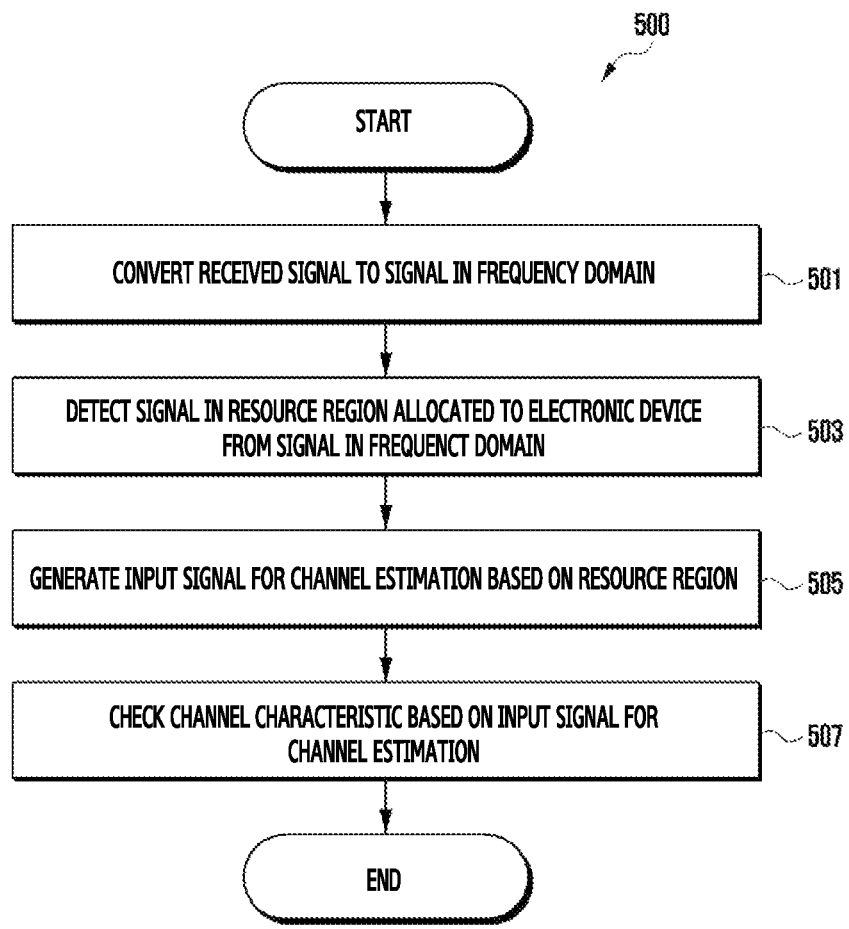
FIG. 5 is a flowchart for checking channel characteristics in an electronic device according to an embodiment of the disclosure.

FIG. 5 is a flowchart for checking channel characteristics in an electronic device according to an embodiment of the disclosure. According to an embodiment, the operations of FIG. 5 may be detailed operations of operation 403 of FIG. 4. In the following embodiment, each operation may be performed sequentially, but is not necessarily performed sequentially. For example, the order of each operation may be changed, and at least two operations may be performed in parallel. For example, the electronic device of FIG. 5 may be the electronic device 101 of FIG. 1 or 2.

Referring to FIG. 5, in a method 500, when the electronic device (e.g., the processor 120 of FIG. 1 or the processor 200 of FIG. 2) receives a signal through at least one antenna (e.g., operation 401 of FIG. 4), in operation 501, the signal of the time domain received through at least one antenna may be converted into a signal of the frequency domain.

According to various embodiments, in operation 503, the electronic device (e.g., the processor 120 or 200) may detect a signal corresponding to at least one resource block (RB) allocated to the electronic device 101 in a signal of the frequency domain. According to an embodiment, the processor 200 (or the signal detection module 310) may detect a signal corresponding to at least one resource block allocated to the electronic device 101 for wireless communication with the transmission device from the signal of the frequency domain obtained through the FFT operation.

According to various embodiments, in operation 505, the electronic device (e.g., the processor 120 or 200) may generate an input signal for channel estimation based on a signal corresponding to at least one resource block (RB) allocated to the electronic device 101. According to an embodiment, the processor 200 (or the input generation module 320) may generate an input signal for channel estimation through decorrelation with a signal corresponding to at least one resource block (RB) allocated to the electronic device 101. For example, the decorrelation (e.g.,) with respect to a signal corresponding to at least one resource block (RB) allocated to the electronic device 101 may comprise a series of operations of generating an input signal for channel estimation by applying a complex conjugate (e.g.,) of a reference signal to a signal corresponding to at least one resource block (RB) allocated to the electronic device 101.

According to an embodiment, the processor 200 (or the input generation module 320) may generate an input signal for channel estimation by dividing a signal corresponding to at least one resource block (RB) allocated to the electronic device 101 into a reference signal. For example, a signal corresponding to at least one resource block (RB) allocated to the electronic device 101 may comprise a reference signal sequence (e.g., DMRS sequence) corresponding to a symbol (e.g., DMRS symbol) including a reference signal among reception signals provided from the communication circuit 210.

According to various embodiments, in operation 507, the electronic device (e.g., the processor 120 or 200) may check channel characteristics of the reception signal based on an input signal for channel estimation. For example, the channel characteristic of the reception signal may comprise a channel response length (CRL) and/or a signal to noise ratio (SNR) of the reception signal.

Figure 6:
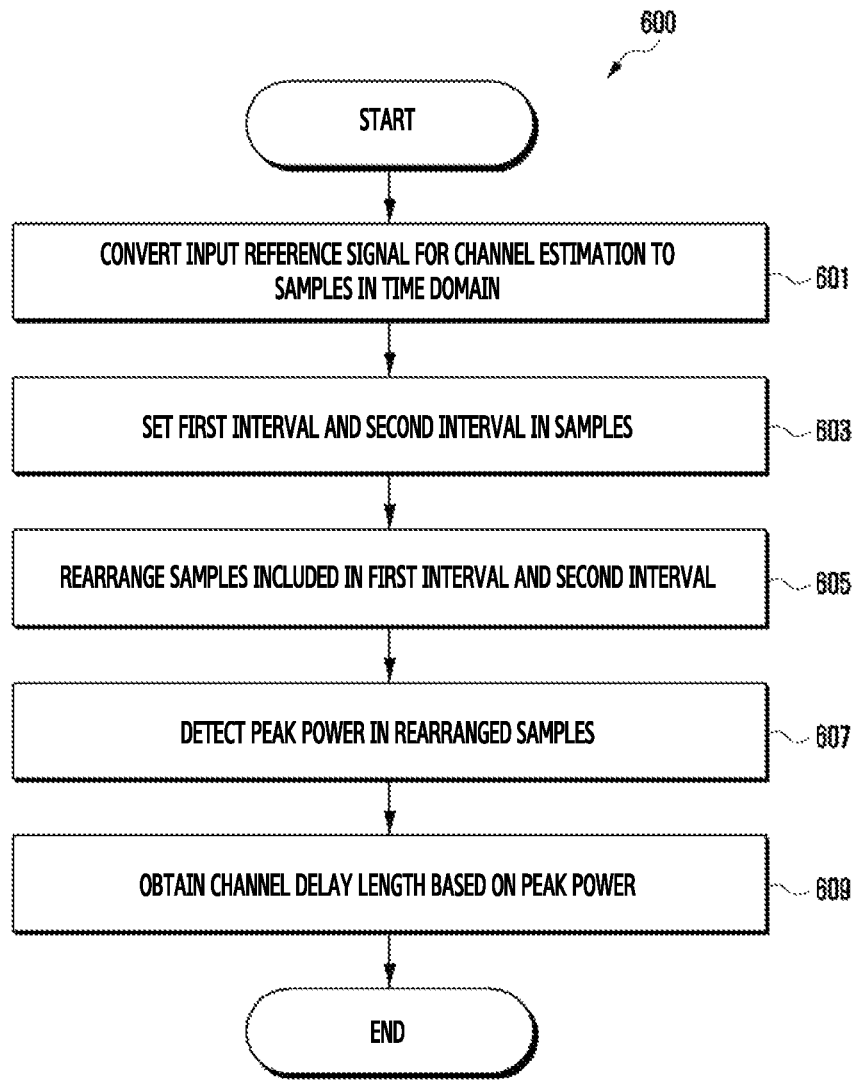
FIG. 6 is a flowchart for checking a channel response length in an electronic device according to an embodiment of the disclosure.

FIG. 6 is a flowchart for checking a channel response length in an electronic device according to an embodiment of the disclosure. According to an embodiment, the operations of FIG. 6 may be detailed operations of operation 507 of FIG. 5. In the following embodiment, each operation may be performed sequentially, but is not necessarily performed sequentially. For example, the order of each operation may be changed, and at least two operations may be performed in parallel. For example, the electronic device of FIG. 6 may be the electronic device 101 of FIG. 1 or 2. At least a portion of FIG. 6 may be described with reference to FIGS. 7A, 7B, and/or 7C.

Figure 7A:
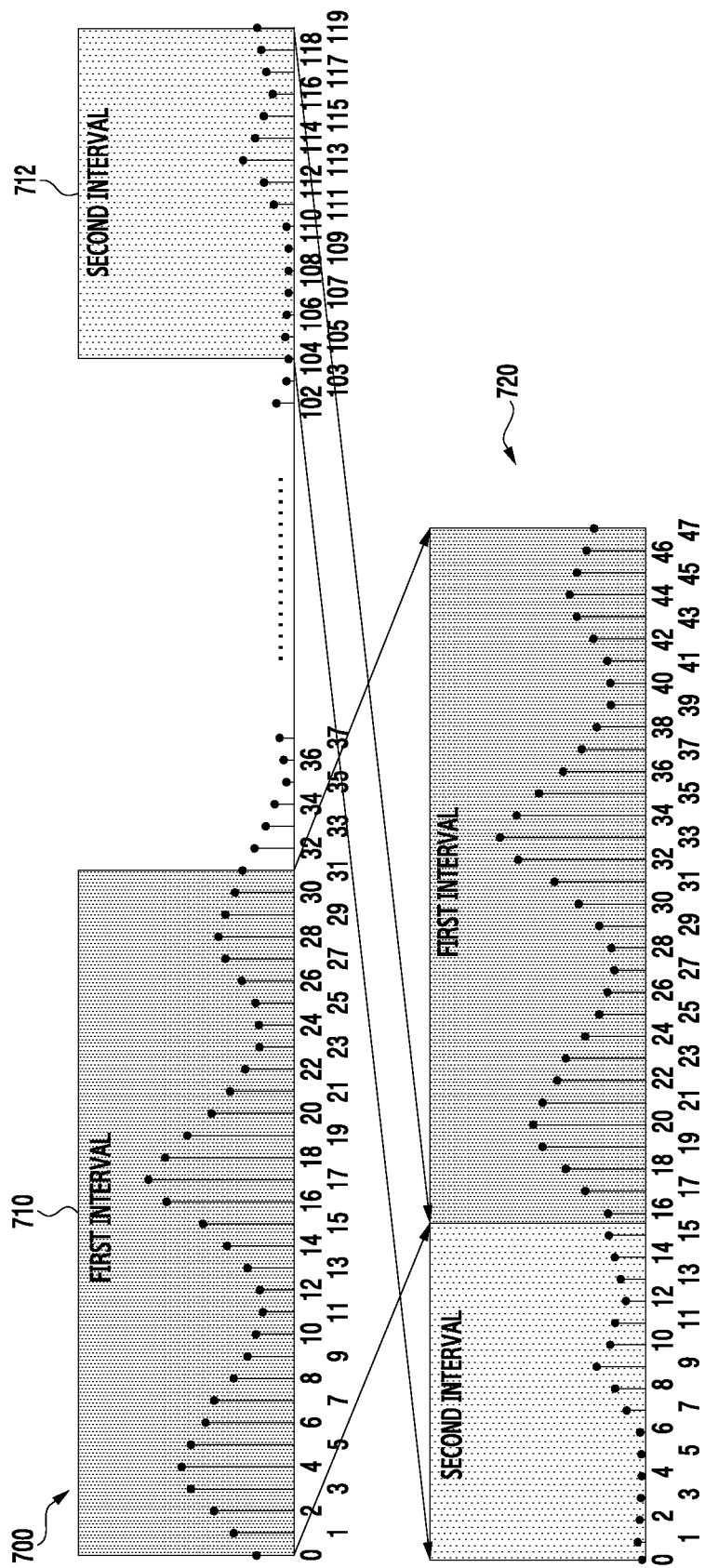
FIG. 7A is an example for setting at least a portion of samples to a first interval and a second interval in an electronic device according to various embodiments.

FIG. 7A is an example for setting at least a portion of samples to a first interval and a second interval in an electronic device according to an embodiment of the disclosure.

Figure 7B:
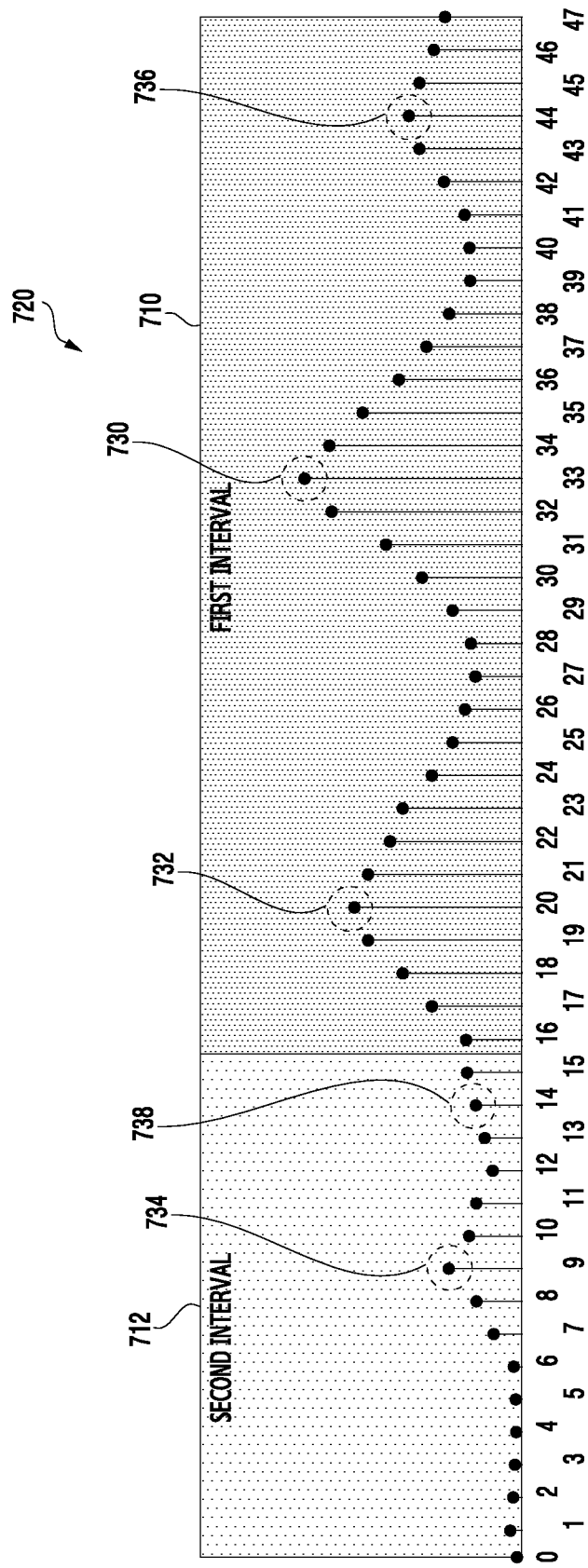
FIG. 7B is an example for detecting peak power in an electronic device according to an embodiment of the disclosure.

FIG. 7B is an example for detecting peak power in an electronic device according to an embodiment of the disclosure.

Figure 7C:
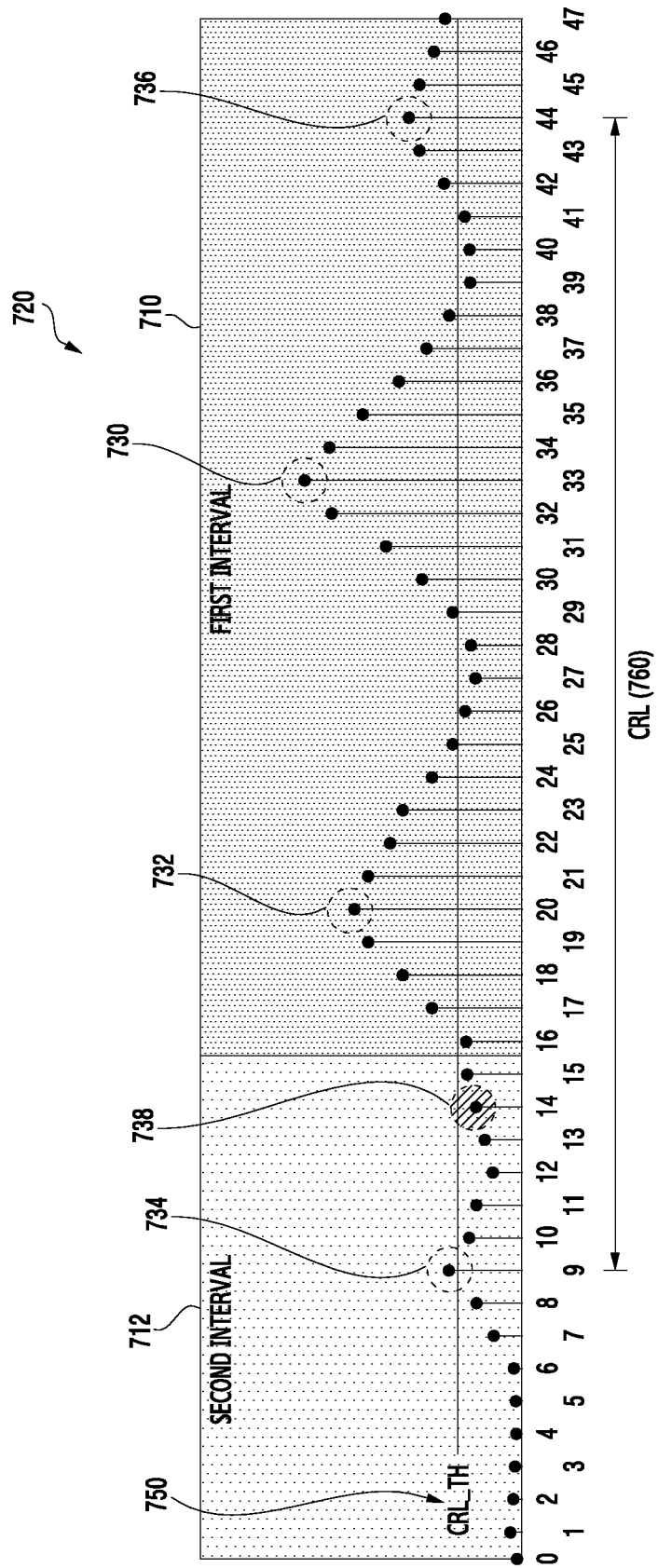
FIG. 7C is an example for estimating a channel response length in an electronic device according to an embodiment of the disclosure.

FIG. 7C is an example for estimating a channel response length in an electronic device according to an embodiment of the disclosure.

Referring to FIGS. 6, 7A, 7B, and 7C, in a method 600, when the electronic device (e.g., processor 120 of FIG. 1 or processor 200 of FIG. 2) generates an input signal for channel estimation (e.g., operation 505 of FIG. 5), in operation 601, the electronic device may convert an input signal (e.g., decorrelated DMRS sequence) for channel estimation into a signal (e.g., sample) of a time domain. According to an embodiment, the processor 200 (or the channel characteristic detection module 330) may convert an input signal for channel estimation generated by the input generation module 320 into a signal (e.g., sample) of a time domain through an IDFT operation. The processor 200 (or the channel characteristic detection module 330) may calculate a power of the complex sample output by the IDFT operation for each sample. For example, when the electronic device 101 is allocated 10 resource blocks (RBs) for wireless communication with the transmission device and one resource block comprises 12 subcarriers, the power of the sample may detect 120 samples 700 as shown in FIG. 7A. For example, 120 samples may be calculated based on the number of resource blocks 10 and the number of subcarriers 12 included in one resource block. For example, the power of the sample may be calculated by applying the complex conjugate to the complex sample output by the IDFT operation. For example, the size of the IDFT operation may be set based on the number (e.g., 120) of subcarriers included in 10 resource blocks (RBs) for the electronic device 101 to perform wireless communication with the transmission device.

According to various embodiments, in operation 603, the electronic device (e.g., processor 120 or 200) may set a first interval (e.g., delay interval) and a second interval (e.g., advance interval) in a signal (e.g., sample) of a time domain. According to an embodiment, the processor 200 (or the channel characteristic detection module 330) may set the first interval 710 and the second interval 712 from samples obtained through the IDFT operation, as shown in FIG. 7A. For example, the first interval 710 and/or the second interval 712 may be set to a fixed length, or may be variably set based on power of each sample.

According to various embodiments, the electronic device (e.g., the processor 120 or 200) may rearrange sample indexes included in the first interval and the second interval in operation 605. According to an embodiment, the processor 200 (or the channel characteristic detection module 330), as shown in FIG. 7A, may rearrange the sample indexes included in the first interval 710 and the second interval 712 such that the index of the most advanced sample (e.g., the sample of index 104) among the samples included in the second interval 712 is the first index (e.g., index 0).

According to various embodiments, in operation 607, the electronic device (e.g., the processor 120 or 200) may detect at least one sample having peak power among the rearranged samples. According to an embodiment, the processor 200 (or the channel characteristic detection module 330) may detect the sample 730 of index 33 having the highest power among the rearranged samples 720 as a global peak, as shown in FIG. 7B. As shown in FIG. 7B, the processor 200 (or the channel characteristic detection module 330) may detect at least one sample 732, 734, 736, and 738 corresponding to the local peak. According to an embodiment, the processor 200 (or the channel characteristic detection module 330) may exclude a sample 738 of index 14, which is lower than the designated first reference power 750 among at least one sample 732, 734, 736, and 738 corresponding to the local peak from the local peak, as shown in FIG. 7C. For example, the designated first reference power 750 may be set based on power of a global peak or noise power. For example, the local peak may comprise at least one peak smaller than the global peak in the rearranged first interval 710 and second interval 712.

According to various embodiments, in operation 609, the electronic device (e.g., the processor 120 or 200) may detect the channel response length (CRL) 760 based on at least one sample having peak power. According to an embodiment, as shown in FIG. 7C, the processor 200 (or the channel characteristic detection module 330) may determine a difference between the smallest index, among the samples 730, 732, 734 and 736 corresponding to the global peak and local peaks greater than the designated first reference power 750 (e.g., index No. 9 (734)), and the largest index (e.g., index 44 736) as a value of a channel response length (e.g., CRL=33). According to an embodiment, as shown in FIG. 7B, the processor 200 (or the channel characteristic detection module 330) may determine a difference between the smallest index (e.g., index 9 (734)), among samples corresponding to the global and local peaks (i.e., sample 730, 732, 734, 736 and 738), and the largest index (e.g., index 44 736) as a value of a channel response length (e.g., CRL=33).

According to various embodiments, the electronic device 101 may revise the channel response length based on the size of the resource allocated by the electronic device 101 for wireless communication with the transmission device. According to an embodiment, the processor 200 (or the channel characteristic detection module 330) may normalize the channel response length of the received signal based on the ratio of the size of the resource allocated to the electronic device 101 to the size of the resource available for the electronic device 101 for wireless communication.

According to various embodiments, the electronic device 101 may omit an operation of rearranging indexes of samples included in the first interval and the second interval. According to an embodiment, as shown in FIG. 7A, the processor 200 may set a channel response length value based on indexes of samples having peak power included in the first interval 710 and the second interval 712 set in a signal (e.g., sample) of a time domain. When the value of the channel response length exceeds a designated reference length set based on the size (or length) of the entire sample, the processor 200 may revise the channel response length based on the entire sample size (or length). For example, the designated reference length may be set to half the size (or length) of the entire sample.

Figure 8A:
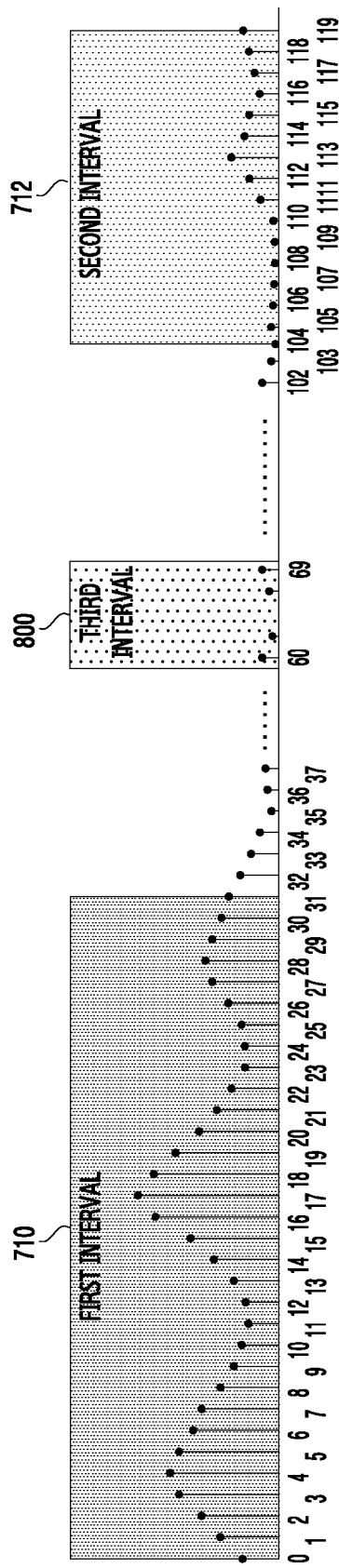
FIG. 8A is an example for estimating noise power in an electronic device according to an embodiment of the disclosure.

FIG. 8A is an example for estimating noise power in an electronic device according to an embodiment of the disclosure.

Referring to FIG. 8A, the electronic device 101 (e.g., processor 120 of FIG. 1 or processor 200 of FIG. 2) may set at least a portion of the remaining interval except for the first interval 710 and the second interval 712 as the third interval 800 (e.g., noise interval) in the signal (e.g., sample) of the time domain converted through the IDFT operation.

According to various embodiments, the electronic device 101 (e.g., the processor 120 or 200) may detect (or calculate) the sum of power of samples included in the third interval 800. The electronic device 101 (e.g., processor 120 or 200) may detect noise power by scaling the sum of power of samples included in the third interval 800 with a scale factor. For example, the scaling variable may be set based on the size of the IDFT operation and the size of the third interval 800.

Figure 8B:
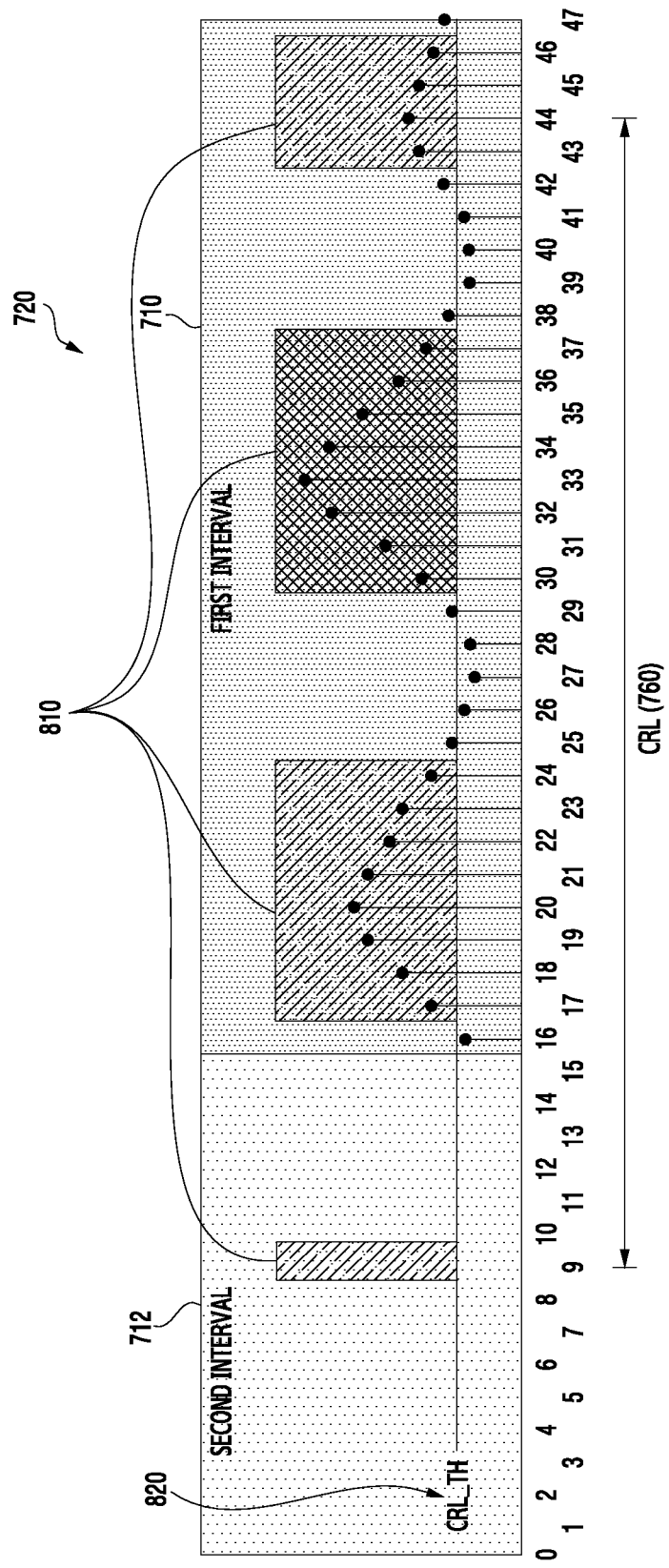
FIG. 8B is an example for estimating signal power in an electronic device according to an embodiment of the disclosure.

FIG. 8B is an example for estimating signal power in an electronic device according to an embodiment of the disclosure.

Referring to FIG. 8B, the electronic device 101 (e.g., processor 120 of FIG. 1 or processor 200 of FIG. 2) may detect (or calculate) the sum of the power of at least one sample exceeding the specified second reference power in the signal (e.g., sample) of the time domain converted through the IDFT operation. According to an embodiment, as shown in FIG. 8B, the processor 200 (or the channel characteristic detection module 330) may detect the sum of power of at least one sample 810 exceeding the designated second reference power 820 among samples included in the first interval 710 and the second interval 712. For example, the designated second reference power 820 may be set to be the same as or different from the designated first reference power 750 of FIG. 7C.

According to various embodiments, the electronic device 101 (e.g., processor 120 or 200) may detect the signal power by removing the noise component from the sum of the power of at least one sample exceeding the designated second reference power. For example, the noise component may be detected based on the number of samples exceeding the designated second reference power and the noise ratio. For example, the noise ratio may be set based on the sum of powers of samples included in the third interval 800 and the number of samples included in the third interval 800.

According to various embodiments, the electronic device 101 (e.g., processor 120 or 200) may detect the signal to noise ratio SNR of the reception signal based on the noise power detected based on FIG. 8A and the signal power detected based on FIG. 8B. According to an embodiment, the processor 200 may detect a signal to noise ratio of a reception signal based on Equation 5 below.

$$SNR = \frac{S_{power}}{NI_{power}} + Func_{SNROffset}(PeakPostion, CRL) \quad \text{Equation 5}$$

For example, SNR may represent a signal to noise ratio of a reception signal, Spower may represent signal power, NIpower may represent noise interference power, peakposition may represent an index (e.g., number 33) of the sample 730 which is the rearranged global peak of FIG. 7B, and CRL may represent a channel response length of the reception signal.

According to an embodiment, when multiple user equipments (UEs) are multiplexed in the same resource block, the processor 200 may set an SNR offset based on a global peak and a channel response length of another user terminal based on Equation 6 below.

$$SNR = \frac{S_{power}}{NI_{power}} + Func_{SNROffset}(PeakPostion_{UE(0)}, CRL_{UE(0)}, \ldots, \quad \text{Equation 6}$$

$$PeakPostion_{UE(N-1)}, CRL_{UE(N-1)}$$

According to various embodiments, the electronic device 101 may detect a time offset with respect to a reception signal based on an index of a global peak. According to an embodiment, the processor 200 may estimate an offset of the time domain based on Equation 7 below.

$$TimeOffset = (PeakPosition - \text{×}|2 + 7|) \cdot \frac{FFTSize}{IDFTSize} \quad \text{Equation 7}$$

For example, time offset may represent an offset of the time domain, peak position may represent an index (e.g., number 33) of the sample 730 which is the rearranged global peak of FIG. 7B, second interval may represent the size of the second interval 712, FFTsize may represent the size of an FFT operation for converting a reception signal into a signal of a frequency domain in the electronic device 101, IDFT size may represent a size of an IDFT operation for converting a signal corresponding to a resource block allocated to the electronic device 101 into a signal of a time domain to detect a channel characteristic.

Figure 9A:
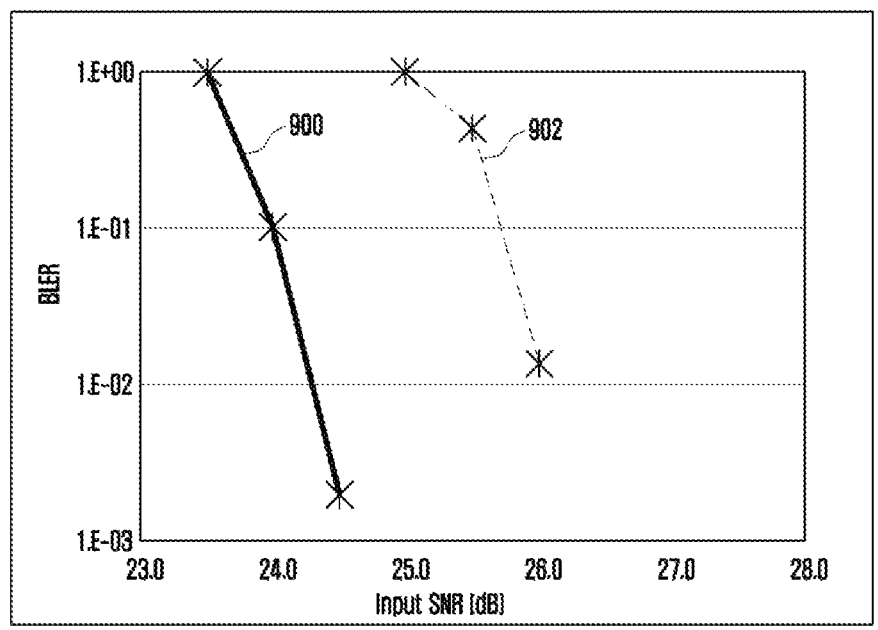
FIG. 9A is an example of a performance change according to adaptively estimating a channel based on an AWGN channel in an electronic device according to an embodiment of the disclosure.
Figure 9B:
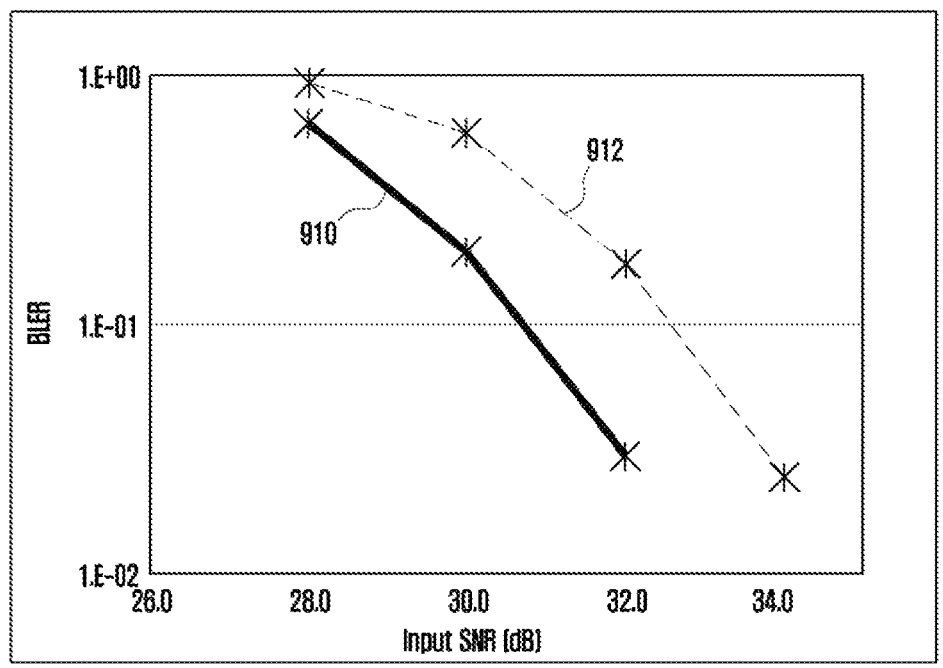
FIG. 9B is an example of a performance change according to adaptively estimating a channel based on a fading channel in an electronic device according to an embodiment of the disclosure.

FIG. 9A is an example of a performance change according to adaptively estimating a channel based on an AWGN channel in an electronic device according to an embodiment of the disclosure. FIG. 9B is an example of a performance change according to adaptively estimating a channel based on a fading channel in an electronic device according to an embodiment of the disclosure. In the following description, the horizontal axis may represent SNR of the reception signal, and the vertical axis may represent a block error rate (BLER).

Referring to FIGS. 9A and 9B, the electronic device 101 may receive a signal transmitted from a transmission device having one antenna through two antennas.

According to various embodiments, as shown in FIG. 9A, the channel gain (e.g., about 1 dB to about 2 dB) of case 900 of estimating the channel based on the channel characteristics (e.g., CRL) of the reception signal may be improved compared to the case 902 of estimating the channel without considering the channel characteristics of the reception signal in an AWGN (additive white Gaussian noise) channel environment.

According to various embodiments, as shown in FIG. 9B, the channel gain (e.g., about 1 dB to about 2 dB) of case 910 of estimating the channel based on the channel characteristics (e.g., CRL) of the reception signal may be improved compared to the case 912 of estimating the channel without considering the channel characteristics of the reception signal in a fading channel environment. For example, the fading channel of FIG. 9B may comprise a state in which the CRL of the reception signal is greater than or equal to a designated first reference value and less than a designated second reference value.

Figure 9C:
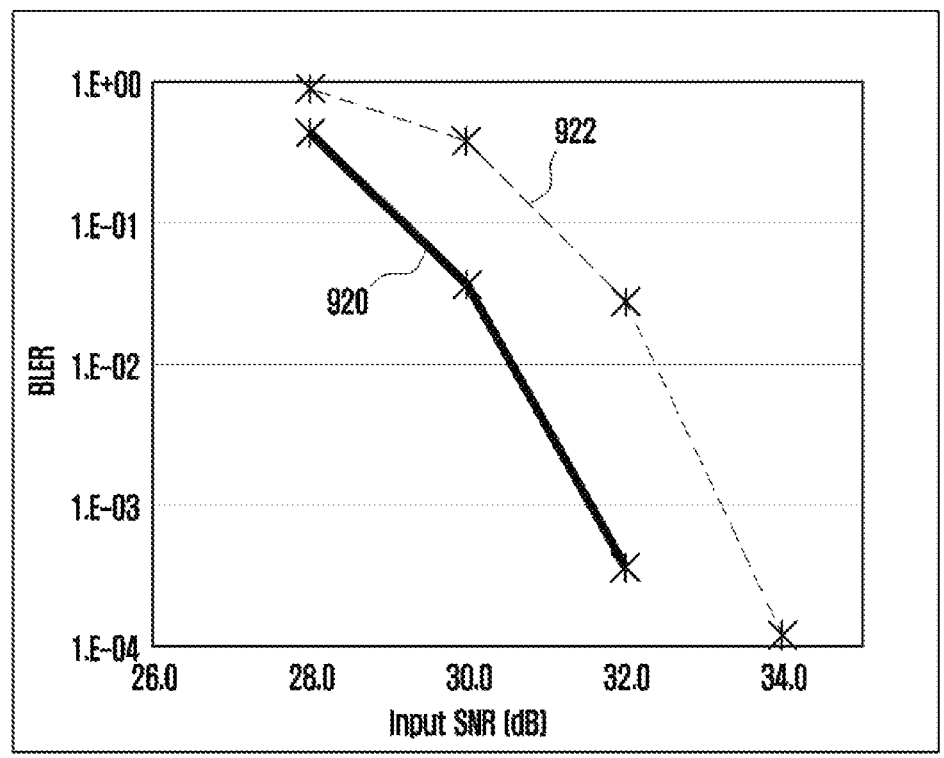
FIG. 9C is an example of a performance change according to adaptively estimating a channel based on a fading channel in an electronic device according to an embodiment of the disclosure.
Figure 9D:
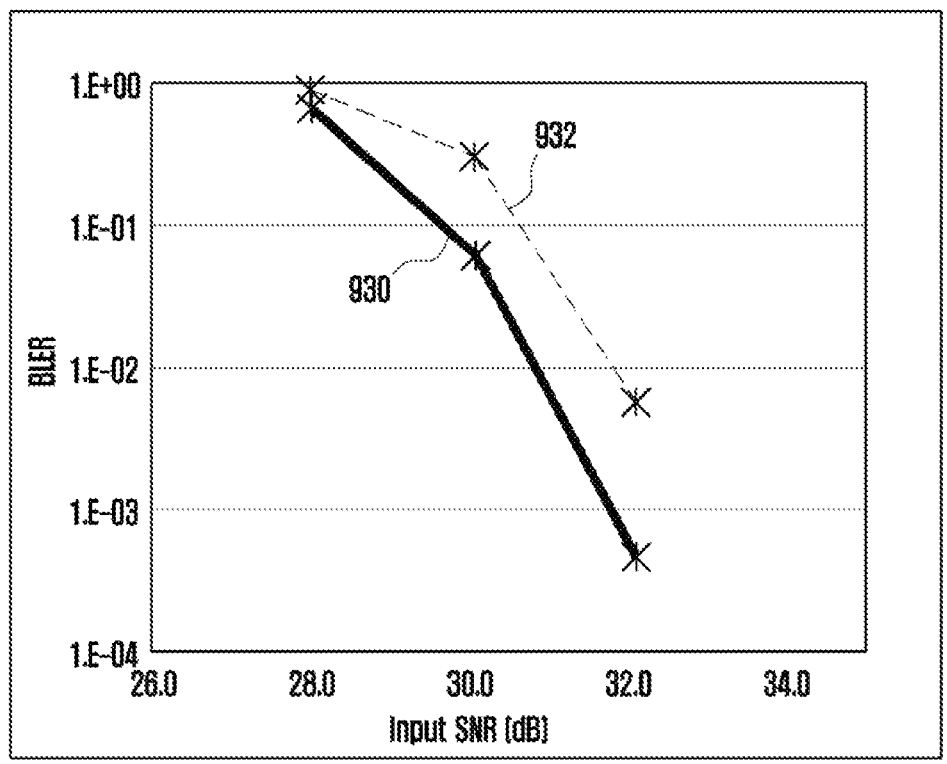
FIG. 9D is an example of a performance change according to adaptively estimating a channel based on a fading channel in an electronic device according to an embodiment of the disclosure.

FIGS. 9C and 9D are examples of performance changes according to adaptively estimating channels based on fading channels in an electronic device according to various embodiments of the disclosure. In the following description, the horizontal axis may represent SNR of the reception signal, and the vertical axis may represent BLER.

Referring to FIGS. 9C and 9D, the electronic device 101 may perform multiple antenna communication (e.g., multiple input multiple output) with the transmission device through 16 antennas.

According to various embodiments, as shown in FIG. 9C, the electronic device 101 may improve a channel gain (e.g., about 1 dB to about 2 dB) of the case 920 of estimating a channel based on a channel characteristic (e.g., CRL) of the reception signal compare to case of estimating a channel without considering the channel characteristics of the reception signal 922 in a fading channel environment in which the CRL of the reception signal is less than the designated first reference value.

According to various embodiments, as shown in FIG. 9D, in a fading channel environment where the CRL of the reception signal is greater than or equal to the designated first reference value and less than the designated second reference value, the electronic device 101 may improve a channel gain (e.g., about 1 dB to about 2 dB) of the case 930 of estimating a channel based on a channel characteristic (e.g., CRL) of the reception signal compared to a case 932 of estimating a channel without considering a channel characteristic of the reception signal. For example, the fading channel of FIG. 9B may comprise a state in which the CRL of the reception signal is greater than or equal to the designated first reference value and less than the designated second reference value.

According to various embodiments, the channel characteristic may include a channel response length and/or a signal to noise ratio.

According to various embodiments, the obtaining a channel characteristic may comprise converting the reception signal received through the at least one antenna into a signal in a frequency domain through a fast Fourier transform (FFT) operation, detecting a signal corresponding to at least one resource region allocated to the electronic device for wireless communication with a transmission device from the signal of the frequency domain, generating an input signal for channel estimation based on the signal corresponding to the at least one resource region, and obtaining the channel characteristic of the reception signal based on the input signal for channel estimation.

According to various embodiments, the generating an input signal may comprise generating the input signal for channel estimation by applying a complex conjugate of the reference signal to the signal corresponding to the at least one resource region.

According to various embodiments, the obtaining a channel characteristic may comprise converting the input signal for channel estimation into samples of a time domain through an inverse discrete Fourier transform (IDFT) operation, obtaining power of each of the samples in the time domain, setting a first interval and a second interval to at least a portion of the samples in the time domain, rearranging indexes of the samples included in the first interval and the second interval, detecting at least one sample having a peak power among the rearranged samples, and setting a value of the channel response length of the reception signal based on an index of the at least one sample having the peak power.

According to various embodiments, the at least one sample having the peak power may include at least one sample having a peak power that exceeds a designated reference power.

According to various embodiments, the designated reference power may be set based on a power of a global peak or a noise power among samples included in the first interval and the second interval.

According to various embodiments, setting a value of the channel response length may comprise setting a difference between a smallest index and a largest index among the at least one sample having the peak power as the value of the channel response length of the reception signal.

According to various embodiments, the method for operating an electronic device may further comprise revising the value of the channel response length based on a size of the FFT operation and a size of the IDFT operation.

According to various embodiments, the estimating a channel may comprise estimating the channel of the reception signal by applying a weight set based on the channel characteristic of the reception signal to at least one subcarrier, among the plurality of subcarriers included in the input signal for channel estimation, included in a channel estimation interval set based on the channel characteristic of the reception signal.

According to various embodiments, the weight is calculated by applying a channel characteristic of the reception signal to a designated function.

According to various embodiments, the power of each of the samples in the time domain is detected by removing a noise component from a sum of a power of at least one sample exceeding the designated reference power.

According to various embodiments, the noise component is detected based on a number of samples exceeding the designated reference power and a noise ratio.

According to various embodiments, a method for operating an electronic device (e.g., the electronic device 101 of FIG. 1 or 2) may comprise obtaining a channel characteristic of a reception signal received through the at least one antenna (e.g., antenna module 197 of FIG. 1), setting a weight and a channel estimation interval for channel estimation based on the channel characteristic of the reception signal, estimating a channel of the reception signal by applying the set weight to at least one subcarrier included in the set channel estimation interval among a plurality of subcarriers included in a reference signal included in the reception signal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
   at least one antenna;
   a communication circuit; and
   at least one processor operably coupled with the at least one antenna and the communication circuit,
   wherein the at least one processor is configured to:
      obtain a channel characteristic of a reception signal received through the at least one antenna,
      set a weight and a channel estimation interval for channel estimation based on the channel characteristic of the reception signal, and
      estimate a channel of the reception signal by applying the weight to at least one subcarrier included in the channel estimation interval among a plurality of subcarriers for a reference signal of the reception signal.
2. The electronic device of claim 1, wherein the channel characteristic includes at least one of a channel response length or a signal to noise ratio.
3. The electronic device of claim 1, wherein the at least one processor is further configured to:
   convert the reception signal received through the at least one antenna into a signal in a frequency domain through a fast Fourier transform (FFT) operation,
   detect a signal corresponding to at least one resource region allocated to the electronic device for wireless communication with a transmitting device from the signal of the frequency domain,
   generate an input signal for channel estimation based on the signal corresponding to the at least one resource region, and
   obtain the channel characteristic of the reception signal based on the input signal for channel estimation.
4. The electronic device of claim 3, wherein the at least one processor is further configured to generate the input signal for channel estimation by applying a complex conjugate of the reference signal to the signal corresponding to the at least one resource region.
5. The electronic device of claim 3, wherein the at least one processor is further configured to:
   convert the input signal for channel estimation into samples of a time domain through an inverse discrete Fourier transform (IDFT) operation,
   obtain power of each of the samples in the time domain,
   set a first interval and a second interval to at least a portion of the samples in the time domain,
   rearrange indexes of the samples included in the first interval and the second interval,
   detect at least one sample having a peak power among the rearranged samples, and
   set a value of a channel response length of the reception signal based on an index of the at least one sample having the peak power.
6. The electronic device of claim 5, wherein the at least one sample includes at least one sample having a peak power that exceeds a designated reference power.

7. The electronic device of claim 6, wherein the designated reference power is set based on a power of a global peak or a noise power among samples included in the first interval and the second interval.

8. The electronic device of claim 5, wherein the at least one processor is configured to set a difference between a smallest index and a largest index among the at least one sample having the peak power as the value of the channel response length of the reception signal.

9. The electronic device of claim 5, wherein the at least one processor is further configured to correct the value of the channel response length based on a size of the FFT operation and a size of the IDFT operation.

10. The electronic device of claim 3, wherein the at least one processor is further configured to estimate the channel of the reception signal by applying a weight set based on the channel characteristic of the reception signal to at least one subcarrier, among the plurality of subcarriers included in the input signal for channel estimation, included in a channel estimation interval set based on the channel characteristic of the reception signal.

11. A method for operating an electronic device, the method comprising:
    obtaining a channel characteristic of a reception signal received through at least one antenna;
    setting a weight and a channel estimation interval for channel estimation based on the channel characteristic of the reception signal; and
    estimating a channel of the reception signal by applying the set weight to at least one subcarrier included in the set channel estimation interval among a plurality of subcarriers included in a reference signal included in the reception signal.

12. The method according to claim 11, wherein the channel characteristic includes at least one of a channel response length or a signal to noise ratio.

13. The method according to claim 11, wherein the obtaining of the channel characteristic comprises:
    converting the reception signal received through the at least one antenna into a signal in a frequency domain through a fast Fourier transform (FFT) operation;
    detecting a signal corresponding to at least one resource region allocated to the electronic device for wireless communication with a transmitting device from the signal of the frequency domain;
    generating an input signal for channel estimation based on the signal corresponding to the at least one resource region; and
    obtaining the channel characteristic of the reception signal based on the input signal for channel estimation.

14. The method according to claim 13, wherein the generating of the input signal comprises:
    generating the input signal for channel estimation by applying a complex conjugate of the reference signal to the signal corresponding to the at least one resource region.

15. The method according to claim 13, wherein the obtaining of the channel characteristic comprises:
    converting the input signal for channel estimation into samples of a time domain through an inverse discrete Fourier transform (IDFT) operation;
    obtaining power of each of the samples in the time domain;
    setting a first interval and a second interval to at least a portion of the samples in the time domain;
    rearranging indexes of the samples included in the first interval and the second interval;
    detecting at least one sample having a peak power among the rearranged samples; and
    setting a value of a channel response length of the reception signal based on an index of the at least one sample having the peak power.

16. The method according to claim 15, wherein the at least one sample having the peak power includes at least one sample having a peak power that exceeds a designated reference power.

17. The method according to claim 16, wherein the designated reference power is set based on a power of a global peak or a noise power among samples included in the first interval and the second interval.

18. The method according to claim 15, wherein the setting of the value of the channel response length comprises:
    setting a difference between a smallest index and a largest index among the at least one sample having the peak power as the value of the channel response length of the reception signal.

19. The method according to claim 15, further comprising:
    revising the value of the channel response length based on a size of the FFT operation and a size of the IDFT operation.

20. The method according to claim 13, wherein the estimating the channel comprises:
    estimating the channel of the reception signal by applying a weight set based on the channel characteristic of the reception signal to at least one subcarrier, among the plurality of subcarriers included in the input signal for channel estimation, included in a channel estimation interval set based on the channel characteristic of the reception signal.

* * * * *